Aug. 17, 1965 A. I. PRESSMAN 3,201,598

MEMORY

Filed Jan. 12, 1961 2 Sheets-Sheet 1

INVENTOR.
ABRAHAM I. PRESSMAN
BY John V. Regan
ATTORNEY

Aug. 17, 1965 A. I. PRESSMAN 3,201,598

MEMORY

Filed Jan. 12, 1961 2 Sheets-Sheet 2

INVENTOR.
ABRAHAM I. PRESSMAN
BY John V. Regan
ATTORNEY

United States Patent Office 3,201,598
Patented Aug. 17, 1965

3,201,598
MEMORY
Abraham I. Pressman, Elkins Park, Pa., assignor to Radio Corporation of America, a corporation of Delaware
Filed Jan. 12, 1961, Ser. No. 82,320
3 Claims. (Cl. 307—88.5)

This invention relates to a memory which is suitable for use in data processing applications.

The invention employs a voltage controlled negative resistance element such as a tunnel diode. Current pulses are employed to write information into the diode. These place the diode in its high or low voltage state. Voltage pulses are employed for read-out. These are applied to the tunnel diode through a positive resistance element such as a conventional diode. The effect of a voltage pulse is to cause a substantial change in current flow through the conventional diode (and through the tunnel diode also) when the tunnel diode is in one state but not when it is in another state. The change in current may be sensed by an element such as a transformer winding in series with either diode. The read-out may be non-destructive or can be made destructive by changing the voltage pulse amplitude in one case or its polarity in another case.

The invention is described in greater detail below and is illustrated in the following drawings of which:

Figure 1:
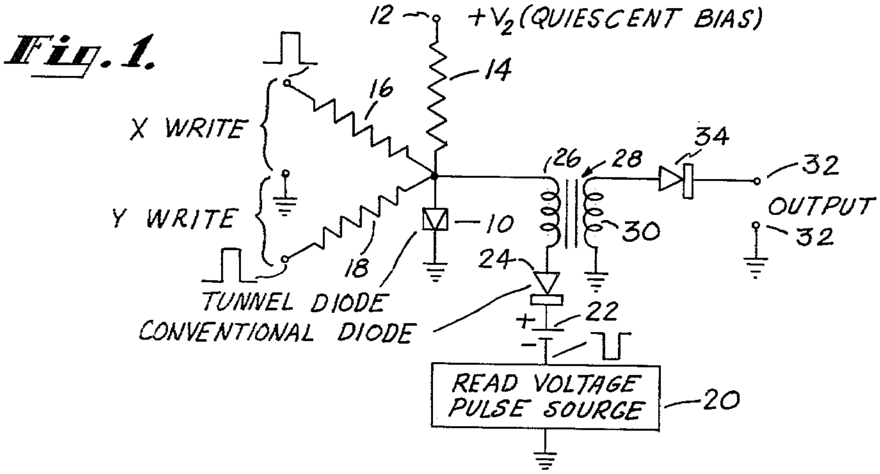
FIG. 1 is a block and schematic circuit diagram of a memory circuit according to the present invention.

The memory circuit of FIG. 1 includes a voltage controlled negative resistance element such as tunnel diode 10 to which a quiescent current is applied through resistor 14 from a voltage source $V_2$ (not shown) connected to terminal 12. X and Y write current pulses are applied to the diode through coupling resistors 16 and 18, respectively. Read voltage pulses are applied to the diode from a source shown schematically as block 20. The direct current component of the applied read voltage is represented schematically as battery 22. A conventional diode 24, and primary winding 26 of a transformer 28 are connected in series with the read voltage pulse source. The circuit output appears across the secondary winding 30 and is applied to the output terminals 32 through a conventional coupling diode 34.

Figure 3:
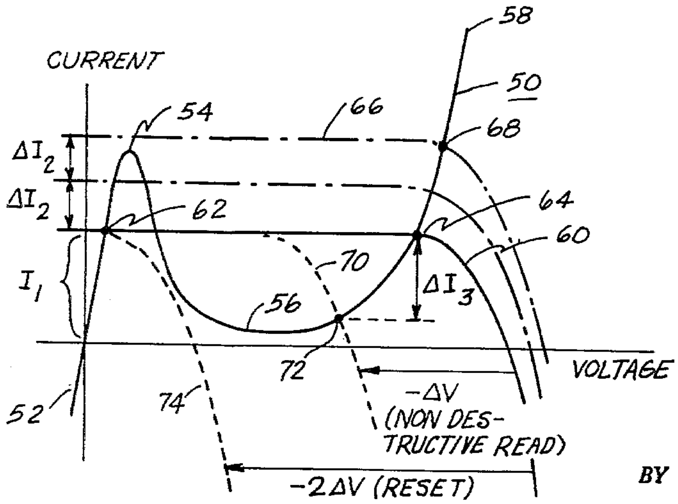
FIGS. 3 and 4 are characteristic curves of current versus voltage for the circuit elements in the memory of FIG. 1, for example, to explain the circuit operation.

The operation of the circuit of FIG. 1 may be better understood by referring to FIG. 3. Curve 50 is a characteristic curve of current versus voltage for tunnel diode 10. There are two positive resistance operating regions, namely 52, 54 and 56, 58 and a negative resistance operating region 54, 56 between the two positive resistance operating regions. The conventional diode 24 is considered as a load on the tunnel diode. The load line formed by diode 24 is shown by solid line 60.

The quiescent current supplied by the current source consisting of the voltage source $V_2$ and resistor 14 is legended $I_1$ in FIG. 3. At this value of current there are two positive resistance region intersections between the load line 60 and the tunnel diode characteristic 50. These are legended 62 and 64, respectively, and define the two possible stable operating points of the circuit. It is arbitrarily assumed for the purposes of the present discussion that low voltage operating point 62 represents storage of the binary digit "zero" and high voltage operating point 64 represents storage of the binary digit "one."

Assume that the tunnel diode initially is storing a binary digit "zero" and it is desired to write a binary digit "one" into the circuit. This requires the coincidence of an X write current pulse and a Y write current pulse. The pulses are applied to the tunnel diode 10 in the forward direction. The pulses are ordinarily of the same amplitude and each moves the load line 60 an increment $\Delta I_2$ in a direction parallel to the current axis. The dot-dash curve 66 illustrates the circuit operation when the X and Y pulses are applied concurrently. It may be observed that there is now only one intersection between the raised load line 66 and the tunnel diode characteristic 50 and this is at 68 in the high voltage state of the diode. What this means is that when two coincident current pulses are applied to the tunnel diode 10 and the tunnel diode is initially in its low voltage state, it switches to an operating point in its high voltage state. When the write pulses are removed, the load line 66 returns to its original position 60 but the operating point is now at 64 in the high voltage state. This corresponds to storage of the binary digit "one."

Read-out from the circuit of FIG. 1 is by means of voltage pulses. In order to read out non-destructively, a voltage pulse 67 from source 20 is applied in the forward direction to the cathode of conventional diode 24. The amplitude of this pulse is such that a voltage $\Delta V$ is applied across the diode. The effect of doing this is shown in FIG. 3 as a shift of the load line in the direction of the voltage axis and amount $-\Delta V$. The shifted load line is shown at 70. It can be seen from the circuit of FIG. 1 that applying a negative pulse to the cathode of conventional diode 24 causes the diode to become forward-biased and tends to make the diode draw current. However, as will be seen from the explanation which follows, if the tunnel diode 10 is originally in its low state, the applied voltage pulse causes substantially no change in the current through the conventional diode 24 whereas if the tunnel diode 10 is initially in its high state, the applied voltage pulse causes a substantial amount of change in current flow through conventional diode 24.

FIG. 3 should be referred to again. Assume first that the tunnel diode 10 is storing the binary digit "zero," that is, the circuit operating point is at 62. This operating point corresponds to a flow of current $I_1$ through the tunnel diode 10 and substantially no current flow through the conventional diode 24. When a voltage pulse is applied in the forward direction to the cathode of the conventional diode 24, the effect is to shift the load line to position 70. However, as is clear from FIG. 3, the circuit operating point remains at 62 which means that there is substantially no change in the current flow through the tunnel diode 10 and which also means that the current flow though the conventional diode 24 remains still at substantially zero current.

Assume now that the circuit operating point is initially at 64 corresponding to storage of the binary digit "one." At this operating point, the current flowing through the tunnel diode 10 is still substantially $I_1$ and the current flowing through the conventional diode 24 is still substantially zero. However, now when a voltage pulse is applied by source 20, the operating point shifts from 64 to 72, the intersection of the shifted load line 70 and the tunnel diode characteristic 50. The increase in current flow through the conventional diode 24 (and decrease in current flow through the tunnel diode 10) is $\Delta I_3$. This change in current $\Delta I_3$ is sensed by the transformer 28. The change in current induces a voltage at the secondary winding 30 which induced voltage is available at the output terminals 32. The applied voltage pulse under the conditions just discussed can be thought of as causing a portion of the current formerly passing into the tunnel diode 10 to steer into the branch circuit containing the conventional diode 24.

The circuit of FIG. 1 can be reset or, if desired read out destructively by applying a larger amplitude voltage pulse from source 20 to the conventional diode 24 in the forward direction of the conventionad diode. The effect of applying a larger amplitude pulse such that the diode drop is $2\Delta V$ is illustrated in FIG. 3 by a shift in the load line 60 to position 74. If the circuit operating point is assumed initially to be at 64, the voltage pulse of amplitude $2\Delta V$ causes the tunnel diode 10 to switch to its low voltage state. This is clear from FIG. 3 since there is no intersection between the shifted curve 74 and the high voltage state of the tunnel diode. The new operating point is at 62 in the low voltage state of the tunnel diode 10. If the operating point is initially at 62, the voltage pulse of amplitude $-2\Delta V$ across the tunnel diode 10 has little effect on the current passing through the conventional diode 24 (or the tunnel diode).

Figure 4:
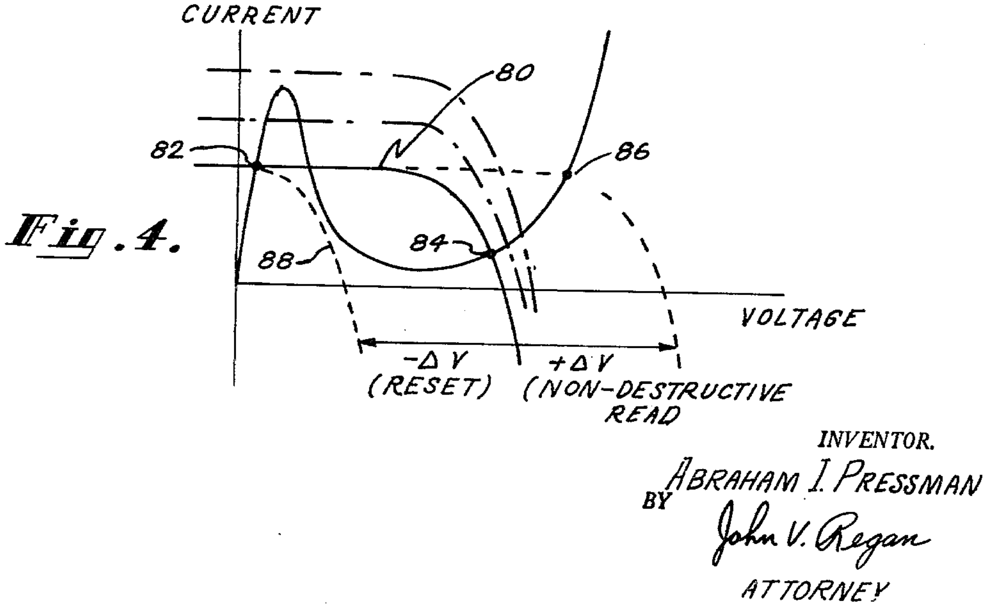

Another way in which the circuit of FIG. 1 may be operated is illustrated in FIG. 4. Here the quiescent biasing voltage lever $V_2$ and the voltage across the battery 22 are such that the load line for the conventional diode appears at 80 (the solid line curve). The low and high voltage state operating points are quiescently at 82 and 84, respectively. The tunnel diode 10 may be read out non-destructively by applying a positive voltage pulse $\Delta V$ from a source such as 20 to the cathode of conventional diode 24. In other words, this pulse is applied to the diode in the reverse direction. If the circuit operating point is intially at 84, the reverse bias voltage pulse $+\Delta V$ shifts the circuit operating point to 86 and the change in current produced causes an output voltage at terminals 32. On the other hand, if the circuit operating point is inititlly at 82, the reverse bias voltage pulse of amplitude $+\Delta V$ has little effect on the current flowing through the conventional diode 34. The operating point remains at 82.

In the mode of operation discussed above, the circuit may be reset or read out destructively by applying a forward voltage pulse of amplitude $\Delta V$ to the conventional diode 24. In other words, a negative pulse is applied to the cathode of the conventional diode from a source such as 20. The effect of this pulse is to shift the load line 80 along the voltage axis to position 88. The only intersection possible with this shifted load line is in the low voltage state of the tunnel diode. Accordingly, if the circuit operating point were initially at 84, the tunnel diode would switch to operating point 82 in its low voltage state.

Figure 2:
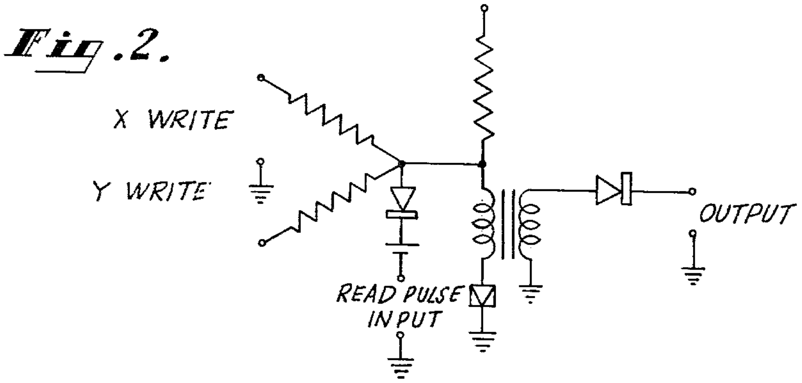
FIG. 2 is a schematic circuit diagram of a modified memory circuit according to the present invention.

The circuit illustrated in FIG. 2 is the same as the one of FIG. 1 except that the transformer is in series with the tunnel diode branch rather than the conventional diode branch. The circuit operation is the same as that of the circuit of FIG. 1. In this circuit and in the one of FIG. 1, output pulses of negative polarity may be obtained by reversing diode 34 and reversing the connections to the transformer secondary winding. Also, the tunnel diode can be reversed in polarity and driven from a negative rather than a positive current source and the coupling diode also reversed and driven by positive pulses.

Figure 5:
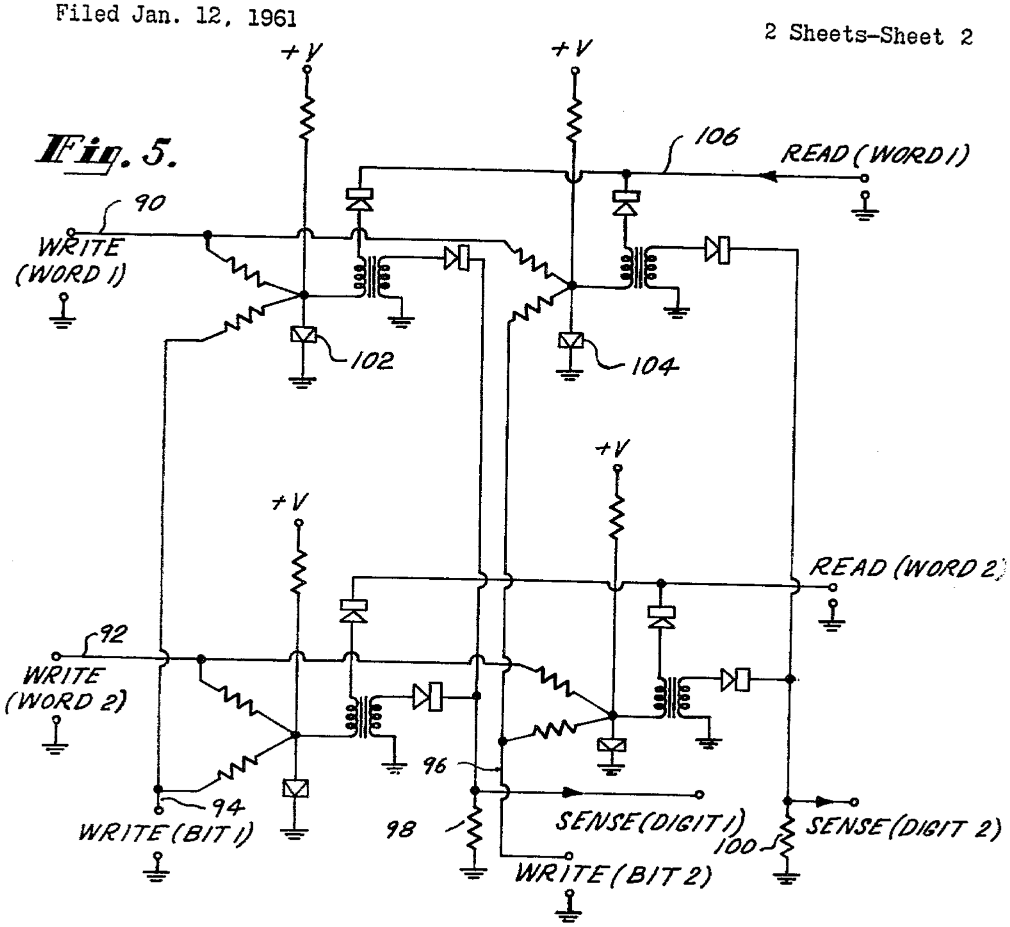
FIG. 5 is a schematic circuit diagram of a two-by-two memory according to the invention.

A two-by-two memory array according to the invention is shown in FIG. 5. The X or "word" write pulses are applied to lines 90 and 92. The binary digit Y or "bit" write pulses are applied to lines 94 and 96. The read-out is sensed as a change in voltage across a resistor. Two such resistors are shown at 98 and 100, respectively.

A digit may be written into a particular tunnel diode element by concurrently applying a word write pulse and a bit write pulse to the tunnel diode. For example, in order to write a "one" into tunnel diode 102, write pulses are applied to lines 90 and 94. All of the tunnel diodes constituting a "word" are read out at the same time. Thus, if it is desired to read out from tunnel diodes 102 and 104, a read pulse may be applied to line 106. The read-out may be destructive or non-destructive as already discussed in detail.

In the discussion above, it is stated that the circuit may be reset by applying voltage pulses to the conventional diode. It is to be understood that the circuit may also be reset by current pulses. For example, current pulses may be applied through resistors 16 and/or 18 to the tunnel diode in the reverse direction in order to reset the tunnel diode to its low voltage state (see FIG. 1).

A practical circuit according to FIG. 1 may have the following circuit parameters:

$+V_2$—$+2$ volts
Resistor 14—220 ohms
Resistors 16 and 18—240 ohms each
Diodes 24 and 34—Type S555G (Germanium)
Transformer 28—Primary 4 turns, No. 38 wire; secondary 8 turns, No. 38 wire
Tunnel diode 10—Gallium Arsenide with 10 milliamperes current peak The above values are representative but are not to be taken as limiting. For example, the tunnel diode can be made of silicon rather than gallium arsenide and other values of resistors and power supply voltages may be employed.

What is claimed is:

1. A memory comprising, in combination, a voltage controlled negative resistance element; means coupled to said element for applying a quiescent current thereto at a level at which operation in either the high or low voltage state is possible; a positive resistance unidirectionally conducting element effectively connected in shunt with the negative resistance element in the same polarity as the negative resistance element; means for writing a binary digit into the negative resistance element comprising means for applying current pulses to said negative resistance element; and means for reading the information stored in said negative resistance element comprising means for applying a voltage pulse to said positive resistance element, and a transformer winding in series with one of said elements.

2. In a tunnel diode memory; a tunnel diode which is quiescently bistably biased; means for applying write current pulses to the diode for placing the diode in a desired voltage state; a positive resistance diode poled in the same direction as the tunnel diode effectively in shunt with the tunnel diode; means for applying voltage pulses to the positive resistance diode in a sense to cause a substantial change in the current flow through the positive resistance diode when the tunnel diode is in one state but not when it is in the other; and a transformer the primary winding of which is connected in series with the positive resistance diode for sensing said change in current flow.

3. In a tunnel diode memory; a tunnel diode which is quiescently bistably biased; means for applying write current pulses to the diode for placing the diode in a desired voltage state; a positive resistance diode poled in the same direction as the tunnel diode effectively in shunt with the tunnel diode; means for applying voltage pulses to the positive resistance diode in a sense to cause a substantial change in the current flow through the positive resistance diode when the tunnel diode is in one state but not when it is in the other; and a transformer, the primary winding of which is in series with said tunnel diode for sensing changes in current flow through said tunnel diode.

(References on following page)

References Cited by the Examiner

UNITED STATES PATENTS

| | | | |
|---|---|---|---|
| 2,585,571 | 2/52 | Mohr | 307—88.5 |
| 2,614,140 | 10/52 | Kreer | 307—88.5 |
| 2,944,164 | 7/60 | Odell et al. | 307—88.5 |
| 3,103,597 | 10/63 | Novick et al. | 307—88.5 |
| 3,106,649 | 10/63 | Johnson | 307—88.5 |

OTHER REFERENCES

International Solid-State Circuits Conference Digest of Technical Papers, 1960, "Esaki-Diode Logic Circuits" by Neff et al., Feb. 10, 1960, pp. 16 and 17.

JOHN W. HUCKERT, *Primary Examiner*.

HERMAN K. SAALBACH, ARTHUR GAUSS, *Examiners*.